United States Patent
Kuo

(10) Patent No.: US 11,520,366 B2
(45) Date of Patent: Dec. 6, 2022

(54) VOLTAGE GENERATION CIRCUIT AND ASSOCIATED CAPACITOR CHARGING METHOD AND SYSTEM

(71) Applicant: REALTEK SEMICONDUCTOR CORPORATION, Hsinchu (TW)

(72) Inventor: Chun-I Kuo, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/513,667

(22) Filed: Oct. 28, 2021

(65) Prior Publication Data

US 2022/0229456 A1 Jul. 21, 2022

(30) Foreign Application Priority Data

Jan. 15, 2021 (TW) .................................. 110101635

(51) Int. Cl.
*G05F 1/575* (2006.01)
*H02J 7/34* (2006.01)

(52) U.S. Cl.
CPC .............. *G05F 1/575* (2013.01); *H02J 7/345* (2013.01); *H02J 2207/50* (2020.01)

(58) Field of Classification Search
None
See application file for complete search history.

(56) References Cited

U.S. PATENT DOCUMENTS

| | | | | |
|---|---|---|---|---|
| 6,023,156 A * | 2/2000 | Buhler | ...................... | G05F 1/56 323/284 |
| 7,068,019 B1 * | 6/2006 | Chiu | ................... | H03F 3/45475 323/273 |
| 8,044,708 B2 * | 10/2011 | Kume | ...................... | G05F 1/56 327/143 |
| 8,461,913 B2 * | 6/2013 | Garrard | ................... | G05F 1/465 327/540 |
| 10,146,239 B2 * | 12/2018 | Deng | ...................... | G05F 1/563 |
| 10,152,071 B2 * | 12/2018 | Ciomaga | ................ | G05F 1/575 |
| 10,192,590 B1 * | 1/2019 | Fifield | ...................... | G05F 1/595 |
| 10,488,875 B1 * | 11/2019 | Olieman | ................ | G05F 1/565 |
| 10,627,839 B2 * | 4/2020 | Ho | ............ | G05F 1/56 |
| 10,803,968 B2 * | 10/2020 | Kunz | ..................... | H03K 19/21 |
| 2005/0073286 A1 * | 4/2005 | Ke | ........................... | G05F 1/575 323/280 |
| 2016/0103459 A1 * | 4/2016 | Chern | .................... | G05F 1/468 323/313 |

* cited by examiner

*Primary Examiner* — Thomas J. Hiltunen
(74) *Attorney, Agent, or Firm* — WPAT, P.C., Intellectual Property Attorneys; Anthony King

(57) ABSTRACT

The present application provides a voltage generation circuit and associated capacitor charging method and system. The voltage generation circuit is in a chip and is for generating a first output voltage and a second output voltage. The chip has a first output port and a second output port coupled to a first capacitor and a second capacitor respectively external to the chip. The voltage generation circuit includes a constant current type voltage generation unit and a regulator. When the voltage generation circuit operates in a first mode, the regulator is configured as a unit gain buffer to charge the first capacitor to the first output voltage; and when the voltage generation circuit operates in a second mode, the regulator is configured as a low-dropout regulator to charge the second capacitor to the second output voltage.

20 Claims, 3 Drawing Sheets

VOLTAGE GENERATION CIRCUIT AND ASSOCIATED CAPACITOR CHARGING METHOD AND SYSTEM

CROSS-REFERENCE TO RELATED APPLICATIONS

This application claims priority of Taiwan application No. 110101635 filed on Jan. 15, 2021, which is incorporated by reference in its entirety.

TECHNICAL FIELD

The present application relates to a voltage generation circuit; in particular, to a voltage generation circuit and an associated capacitor charging method and system capable of reaching a stable state quickly at power-on.

BACKGROUND

For systems that require fast start-up, such as Bluetooth headsets, it is desirable to achieve a stable state as soon as possible after start-up and for the user to use the system normally. For this reason, the system's regulator needs to have a higher driving ability. However, such systems are generally very power-conscious, and a regulator with a higher driving ability will significantly increase the system's overall power consumption. Therefore, how to take care of the start-up speed and power consumption of the regulator at the same time has become one of the most critical issues to be solved in this field.

SUMMARY OF THE INVENTION

The present application discloses a voltage generation circuit, disposed in a chip and configured to generate a first output voltage and a second output voltage, wherein the second output voltage is greater than the first output voltage, and the chip has a first output port and a second output port respectively coupled to a first capacitor and a second capacitor external to the chip. The voltage generation circuit includes: a constant-current type voltage generation unit; a regulator, coupled to an output terminal of the constant-current type voltage generation unit; a first switch, coupled between the output terminal of the constant-current type voltage generation unit and the first output port; and a second switch, coupled between an output terminal of the regulator and the first output port; wherein when the voltage generation circuit operates in a first mode, the first switch is nonconducting, the second switch is conducting, the output terminal of the constant-current type voltage generation unit outputs the first output voltage to the regulator, and the regulator is configured as a unit gain buffer to charge the first capacitor to the first output voltage; and when the voltage generation circuit operates in a second mode, the first switch is conducting, the second switch is nonconducting, the output terminal of the constant-current type voltage generation unit outputs the first output voltage to the regulator, the regulator is configured as a low dropout regulator to charge the second capacitor to the second output voltage.

The present application discloses a capacitor charging method, configured to generate a first output voltage and a second output voltage in a chip, wherein the second output voltage is greater than the first output voltage, and the chip has a first output port and a second output port, respectively coupled to a first capacitor and a second capacitor external to the chip. The capacitor charging method includes: in a first mode, using a constant-current type voltage generation unit to output the first output voltage to a regulator, and configuring the regulator as a unit gain buffer to charge the first capacitor to the first output voltage; and in a second mode, using the constant-current type voltage generation unit to generate the first output voltage to the regulator, and configuring the regulator as a low dropout regulator to charge the second capacitor to the second output voltage.

The present application discloses a system, including: a first capacitor; a second capacitor; and a chip, including: a first output port, coupled to the first capacitor; a second output port, coupled to the second capacitor; and a voltage generation circuit, configured to generate a first output voltage and a second output voltage, wherein the second output voltage is greater than the first output voltage, and the voltage generation circuit includes: a constant-current type voltage generation unit; a regulator, coupled to an output terminal of the constant-current type voltage generation unit; a first switch, coupled between the output terminal of the constant-current type voltage generation unit and the first output port; and a second switch, coupled between an output terminal of the regulator and the first output port; wherein when the voltage generation circuit operates in a first mode, the first switch is nonconducting, the second switch is conducting, the output terminal of the constant-current type voltage generation unit outputs the first output voltage to the regulator, and the regulator is configured as a unit gain buffer to charge the first capacitor to the first output voltage; and when the voltage generation circuit operates in a second mode, the first switch is conducting, the second switch is nonconducting, the output terminal of the constant-current type voltage generation unit outputs the first output voltage to the regulator, the regulator is configured as a low dropout regulator to charge the second capacitor to the second output voltage.

The above voltage generation circuit and an associated capacitor charging method and system are able to take care of the start-up speed and power consumption of the regulator at the same time.

DETAILED DESCRIPTION

Figure 1:
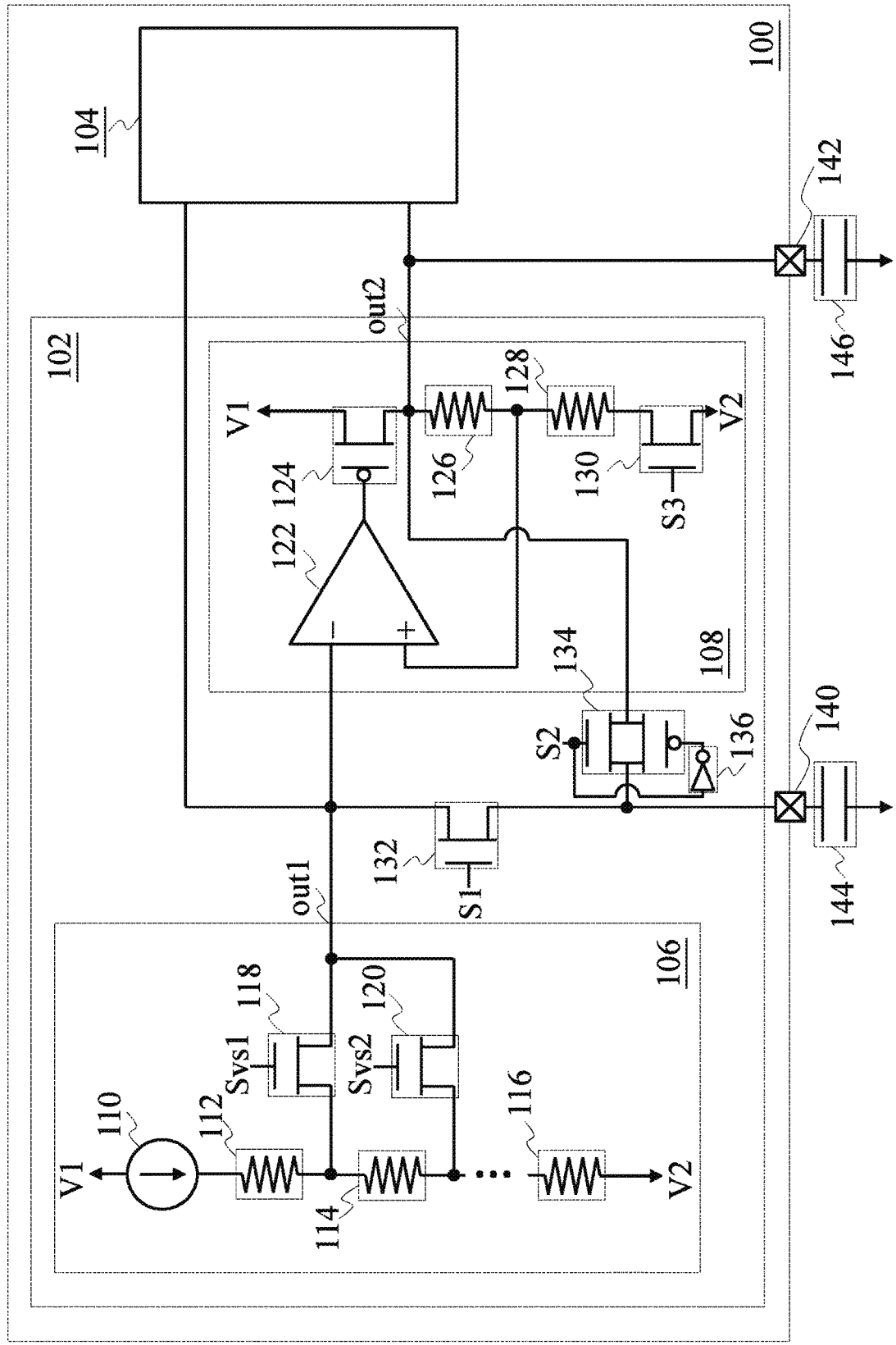
FIG. 1 is a schematic diagram illustrating a system according to embodiments of the present disclosure.

FIG. 1 as a whole is a schematic diagram illustrating a system according to embodiments of the present disclosure. The system includes a chip 100. The chip 100 has a first output port 140 and a second output port 142, respectively coupled to a first capacitor 144 and a second capacitor 146 external to the chip 100. The chip 100 includes a voltage generation circuit 102, which is configured to supply a reference voltage a circuit module 104 in the chip 100; for example, the chip 100 is used in Bluetooth-associated applications, and the circuit module 104 is a digital-to-analog converter or an analog-to-digital converter. After the voltage generation circuit 102 is powered on (e.g., after system start-up) and reaches a stable state, it generates a first output voltage Vout1 and a second output voltage Vout2 to the circuit module 104, wherein the second output voltage Vout2 is greater than the first output voltage Vout1. For example, when the circuit module 104 is a digital-to-analog converter or an analog-to-digital converter, the second output voltage Vout2 is twice the first output voltage Vout1, thereby resulting in the maximum signal-to-noise ratio. The present disclosure intends to reduce the time it requires for the voltage generation circuit 102 to reach the stable state after power-on, while at the same time do not increase the power consumption when the voltage generation circuit 102 is in the stable state.

The first capacitor 144 and the second capacitor 146 external to the chip 100 are configured to filter out noises. When the voltage generation circuit 102 starts, it charges the first capacitor 144 and the second capacitor 146 to the first output voltage Vout1 and the second output voltage Vout2; the voltage generation circuit 102 only reaches the stable state after the charging completes. Therefore, one focus of the present disclosure is to reduce the speed at which the first capacitor 144 and the second capacitor 146 are charged, particularly to the speed at which the first capacitor 144 is charged (see below for detailed discussion).

As shown in FIG. 1, the voltage generation circuit 102 includes a constant-current type voltage generation unit 106 and a regulator 108, wherein the two components are configured to supply the voltage but in different ways. The constant-current type voltage generation unit 106 includes a current source 110 coupled to the first reference voltage V1, wherein the current source 110 generates a fixed current flowing through resistors 112, 114, 116 connected in series between the current source 110 and the second reference voltage V2, and the current generates a voltage change. It is feasible to configure the output terminal out1 of the constant-current type voltage generation unit 106 to output the desired voltage level by setting the voltage selection switches 115, 120; e.g., by setting both signals Svs1 and Svs2 as 1 to generate the first output voltage Vout1. The constant-current type voltage generation unit 106 can be implemented is various means, which can be complex or simple; for example, the most basic embodiment includes only the current source 110 and resistors 112, 114, wherein the node between the resistors 112, 114 is used as the output terminal out1. Besides, the first reference voltage V1 and the second reference voltage V2 are different; for example, the second reference voltage V2 may be a ground voltage. The implementations of the voltage selection switches 118, 120 are not particularly limited; for example, the voltage selection switch can be an N-type or P-type transistor.

Since the current supplied by the current source 110 remains fixed after the voltage generation circuit 102 starts and reaches a stable state, which directly affects the overall system power consumption, thus the current supplied by the current source 110 is generally not very large.

The voltage generation circuit 102 further includes the regulator 108, a first switch 132, and a second switch 134. The regulator 108 coupled to the output terminal out1 of the constant-current type voltage generation unit 106 and generates the second output voltage Vout2 according to the first output voltage Vout1 outputted by the constant-current type voltage generation unit 106. The first switch 132 is coupled between the output terminal out1 of the constant-current type voltage generation unit 106 and the first output port 140. The second switch 134 is coupled between the output terminal out2 of the regulator 108 and the first output port 140.

The amplifier 122 of the regulator 108 has a positive terminal (+), a negative terminal (−), and an output terminal, wherein the negative terminal is coupled to the output terminal out1 of the constant-current type voltage generation unit 106. The gate of the P-type transistor 124 is coupled to the output terminal of the amplifier 122, the source of the P-type transistor 124 is coupled to the first reference voltage V1, and the drain of the P-type transistor 124 is coupled to the output terminal out2 of the regulator 108. One terminal of the resistor 126 is coupled to the drain of the P-type transistor 124, whereas the other terminal thereof is coupled to the positive terminal of the amplifier 122. The resistor 128 and the third switch 130 are sequentially connected in series between the resistor 126 and the second reference voltage V2.

The constant-current type voltage generation unit 106 can supply a fixed current, while the regulator 108 can supply a non-fixed current; and hence, the driving ability of the regulator 108 is much greater than that of the constant-current type voltage generation unit 106, and such a feature is used in this application. When the voltage generation circuit 102 is first started, signals S1, S2 and S3 are used to turn off the first switch 132 and the third switch 130 and to turn on the second switch 134 to set the voltage generation circuit 102 in the first mode, so that the output terminal out1 of the constant-current type voltage generation unit 106 outputs the first output voltage Vout1 to the regulator 108, and the regulator 108 charges the first capacitor 144 and the second capacitor 146. When the first capacitor 144 and the second capacitor 146 are charged to the first output voltage Vout1, signals S1, S2, and 53 are used to turn on the first switch 132 and the third switch 130, and to turn off the second switch 134 to set the voltage generation circuit 102 in the second mode, so that the output terminal out1 of the constant-current type voltage generation unit 106 outputs the first output voltage Vout1 to the regulator 108, and the regulator 108 continues to charge the second capacitor 146 to the second output voltage Vout2.

Figure 2:
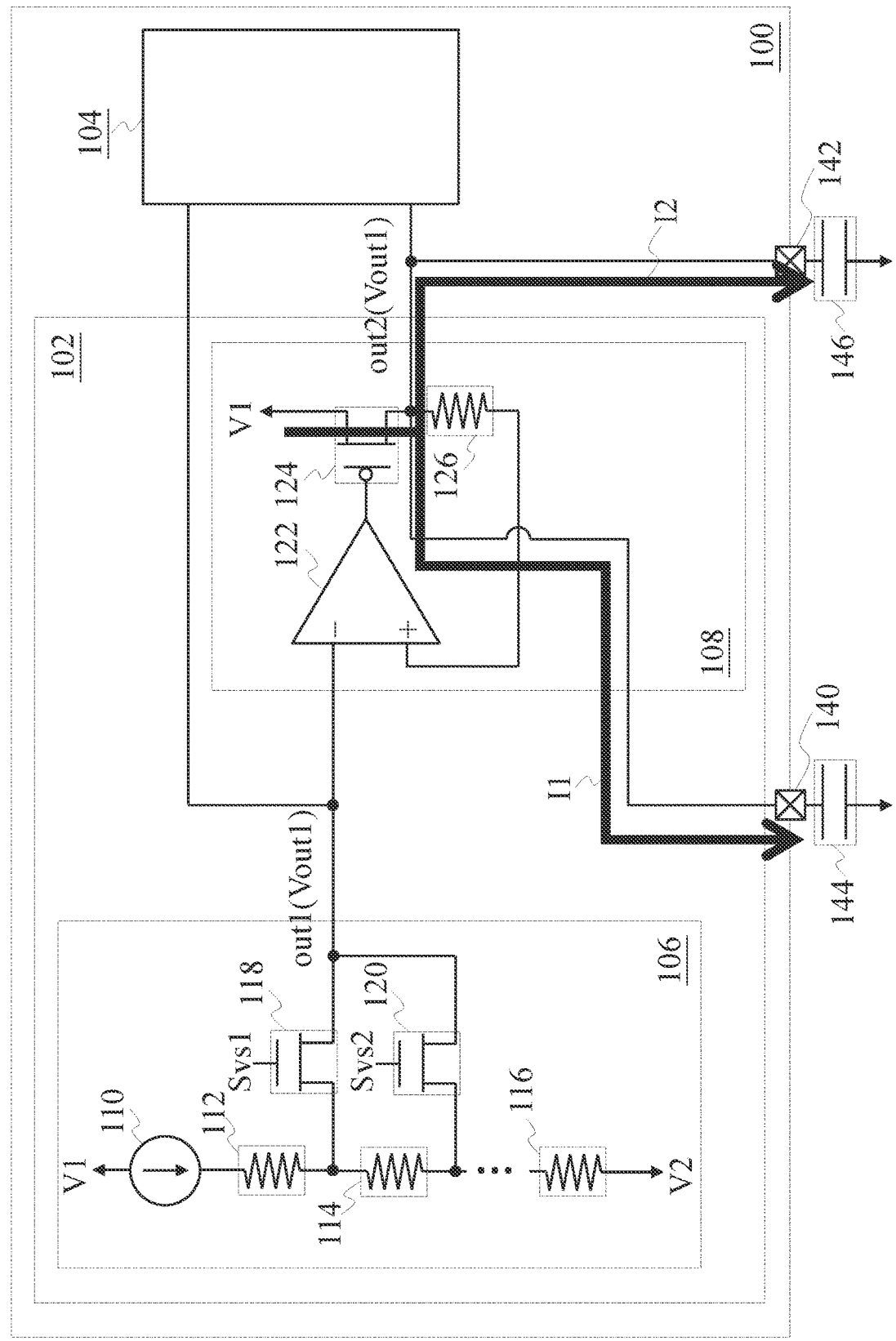
FIG. 2 is an equivalent schematic diagram of the present system operating in the first mode.

FIG. 2 is an equivalent schematic diagram of the present system operating in the first mode. The output terminal out1 of the constant-current type voltage generation unit 106 outputs the first output voltage Vout1 the regulator 108, and the regulator 108 is configured as a unit gain buffer in the first mode so that the output terminal out2 of the regulator 108 outputs the first output voltage Vout1. The current flows from the first reference voltage V1 through the P-type transistor 124 and then passes the first output port 140 and the second output port 142 respectively, to charge the first capacitor 144 and the second capacitor 146 with current I1 and current I2. In this mode, the current supplied to the first capacitor 144 and the second capacitor 146 (that is, the sum of the current I1 and the current I2) is much larger than the current supplied by the current source 110. Theoretically, the smaller is the resistance on the path from the first reference voltage V1 to the first capacitor 144 and the second capacitor 146, the greater is the current. Therefore, the design of the second switch 134 can use an N-type transistor and a P-type transistor in parallel connection to reduce the equivalent resistance of the second switch 134. As shown in FIG. 1, the signal S2 can use an inverter 136 to synchronously turn on the N-type transistor and the P-type transistor of the second switch 134.

Figure 3:
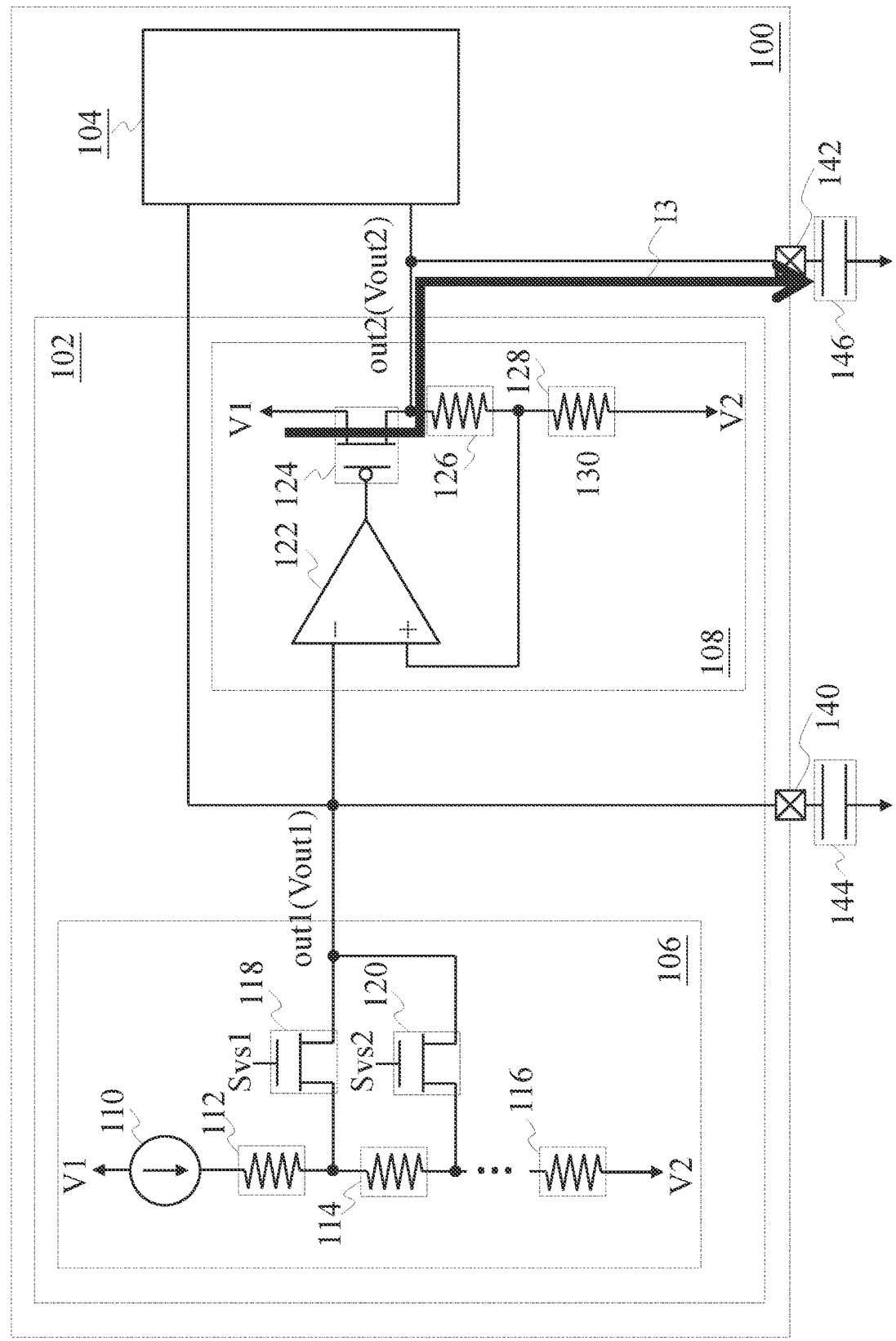
FIG. 3 is an equivalent schematic diagram of the present system operating in the second mode.

FIG. 3 is an equivalent schematic diagram of the present system operating in the second mode. The output terminal out1 of the constant-current type voltage generation unit 106 still outputs the first output voltage Vout1 to the regulator 108, and the regulator 108 is configured as a low dropout regulator in the second mode. Since both the positive terminal and the negative terminal of the regulator 108 are locked in the first output voltage Vout1, the second output voltage Vout2 outputted by the output terminal out2 of the regulator 108 is greater than the first output voltage Vout1. For example, when the second reference voltage V2 is the ground voltage, and the resistors 126 and 130 have the same resistance, the second output voltage Vout2 outputted by the output terminal out2 of the regulator 108 is twice the first output voltage Vout1. The current I3 flows from the first reference voltage V1 through the P-type transistor 124 and passes the second output port 142 to charge the second capacitor 146, so as to charge the voltage of the second capacitor 146 from the first output voltage Vout1 to the second output voltage Vout2.

As shown in FIGS. 1 to 3, the current does not pass through the first switch 132 and the third switch 130 when charging the first capacitor 144 and/or the second capacitor 146, so it is not necessary to reduce the resistance of the first switch 132 and the third switch 130.

The voltage generation circuit 102 of the present disclosure only uses a higher current in the first mode and the second mode before reaching the stable state to speed up the charging of the capacitors 144 and 142 external to the chip 100, and therefore does not affect the power consumption after reaching the stable state. The system of the present application can be used in many applications, for example, when applied to a Bluetooth headset, to reduce the start-up time to about 1/10th of the original time and not to increase the power consumption in the stable state after start-up.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of embodiments introduced herein. It should be understood that the steps mentioned in the flowchart of the method of the present application can be adjusted in accordance with the actual needs except for those whose sequences are specifically stated, and can even be executed simultaneously or partially simultaneously. In addition, the above-mentioned modules or method steps can be implemented by hardware, software or firmware according to the designer's needs. Those skilled in the art should also realize that such equivalent embodiments still fall within the spirit and scope of the present disclosure, and they may make various changes, substitutions, and alterations thereto without departing from the spirit and scope of the present disclosure.

What is claimed is:

1. A voltage generation circuit, disposed in a chip and configured to generate a first output voltage and a second output voltage, wherein the second output voltage is greater than the first output voltage, and the chip has a first output port and a second output port respectively coupled to a first capacitor and a second capacitor external to the chip, the voltage generation circuit comprising:
   a constant-current type voltage generation unit;
   a regulator, coupled to an output terminal of the constant-current type voltage generation unit;
   a first switch, coupled between the output terminal of the constant-current type voltage generation unit and the first output port; and
   a second switch, coupled between an output terminal of the regulator and the first output port;
   wherein when the voltage generation circuit operates in a first mode, the first switch is nonconducting, the second switch is conducting, the output terminal of the constant-current type voltage generation unit outputs the first output voltage to the regulator, and the regulator is configured as a unit gain buffer to charge the first capacitor to the first output voltage; and
   when the voltage generation circuit operates in a second mode, the first switch is conducting, the second switch is nonconducting, the output terminal of the constant-current type voltage generation unit outputs the first output voltage to the regulator, the regulator is configured as a low dropout regulator to charge the second capacitor to the second output voltage.

2. The voltage generation circuit of claim 1, wherein the regulator further charges the second capacitor to the first output voltage when the voltage generation circuit operates in the first mode.

3. The voltage generation circuit of claim 1, wherein the second switch includes an N-type transistor and a P-type transistor in parallel connection.

4. The voltage generation circuit of claim 1, wherein the constant-current type voltage generation unit comprises:
   a current source, coupled to the first reference voltage;
   a first resistor and second resistor, connected in series between the current source and the second reference voltage; and
   a first voltage selection switch, wherein a first terminal of the first voltage selection switch is coupled between the first resistor and the second resistor, and a second terminal of the first voltage selection switch is coupled to the output terminal of the constant-current type voltage generation unit.

5. The voltage generation circuit of claim 1, wherein the regulator comprises:
   an amplifier, having a positive terminal, a negative terminal, and an output terminal, wherein the negative terminal is coupled to the output terminal of the constant-current type voltage generation unit;
   a P-type transistor, having a gate, a drain, and a source, wherein the gate is coupled to the output terminal of the amplifier, the source is coupled to the first reference voltage, and the drain is coupled to the output terminal of the regulator;
   a third resistor, having a terminal coupled to the drain of the P-type transistor and another terminal coupled to the positive terminal of the amplifier;
   a fourth resistor, connected in series between the third resistor and the second reference voltage; and
   a third switch, connected in series between the third resistor and the second reference voltage.

6. The voltage generation circuit of claim 5, wherein when the voltage generation circuit operates in the first mode, the third switch is nonconducting; and when the voltage generation circuit operates in the second mode, the third switch is conducting.

7. The voltage generation circuit of claim 5, wherein the resistance of the third resistor is the same as the resistance of the fourth resistor.

8. The voltage generation circuit of claim 7, wherein the second output voltage is twice the first output voltage.

9. The voltage generation circuit of claim 1, wherein the first output voltage and the second output voltage are used as a reference voltage of a digital-to-analog converter in the chip.

10. The voltage generation circuit of claim 1, wherein the first output voltage and the second output voltage are used as a reference voltage of an analog-to-digital converter in the chip.

11. A capacitor charging method, configured to generate a first output voltage and a second output voltage in a chip, wherein the second output voltage is greater than the first output voltage, and the chip has a first output port and a second output port, respectively coupled to a first capacitor and a second capacitor external to the chip, the capacitor charging method comprising:
- in a first mode, using a constant-current type voltage generation unit to output the first output voltage to a regulator, and configuring the regulator as a unit gain buffer to charge the first capacitor to the first output voltage; and
- in a second mode, using the constant-current type voltage generation unit to generate the first output voltage to the regulator, and configuring the regulator as a low dropout regulator to charge the second capacitor to the second output voltage.

12. The capacitor charging method of claim 11, wherein in the first mode, configuring the regulator as the unit gain buffer to charge the first capacitor to the first output voltage includes:
- using a first switch to disconnect an output terminal of the constant-current type voltage generation unit from the first output port, and using the second switch to couple an output terminal of the regulator to the first output port.

13. The capacitor charging method of claim 11, wherein the regulator further charges the second capacitor to the first output voltage in the first mode.

14. The capacitor charging method of claim 11, wherein in the second mode, configuring the regulator as the low dropout regulator to charge the second capacitor to the second output voltage includes:
- using a first switch to couple an output terminal of the constant-current type voltage generation unit to the first output port, and using a second switch to disconnect an output terminal of the regulator from the first output port.

15. A system, comprising:
- a first capacitor;
- a second capacitor; and
- a chip, including:
  - a first output port, coupled to the first capacitor;
  - a second output port, coupled to the second capacitor; and
  - a voltage generation circuit, configured to generate a first output voltage and a second output voltage, wherein the second output voltage is greater than the first output voltage, and the voltage generation circuit includes:
    - a constant-current type voltage generation unit;
    - a regulator, coupled to an output terminal of the constant-current type voltage generation unit;
    - a first switch, coupled between the output terminal of the constant-current type voltage generation unit and the first output port; and
    - a second switch, coupled between an output terminal of the regulator and the first output port;
  - wherein when the voltage generation circuit operates in a first mode, the first switch is nonconducting, the second switch is conducting, the output terminal of the constant-current type voltage generation unit outputs the first output voltage to the regulator, and the regulator is configured as a unit gain buffer to charge the first capacitor to the first output voltage; and
  - when the voltage generation circuit operates in a second mode, the first switch is conducting, the second switch is nonconducting, the output terminal of the constant-current type voltage generation unit outputs the first output voltage to the regulator, the regulator is configured as a low dropout regulator to charge the second capacitor to the second output voltage.

16. The system of claim 15, wherein the regulator further charges the second capacitor to the first output voltage when the voltage generation circuit operates in the first mode.

17. The system of claim 15, wherein the constant-current type voltage generation unit comprises:
- a current source, coupled to a first reference voltage;
- a first resistor and second resistor, connected in series between the current source and second reference voltage; and
- a first voltage selection switch, wherein a first terminal of the first voltage selection switch is coupled between the first resistor and the second resistor, and a second terminal of the first voltage selection switch is coupled to the output terminal of the constant-current type voltage generation unit.

18. The system of claim 15, wherein the regulator comprises:
- an amplifier, having a positive terminal; a negative terminal, and an output terminal, the negative terminal being coupled to the output terminal of the constant-current type voltage generation unit;
- a P-type transistor, having a gate, a drain, and a source, wherein the gate is coupled to the output terminal of the amplifier, the source is coupled to the first reference voltage, and the drain is coupled to the output terminal of the regulator;
- a third resistor, having a terminal coupled to the drain of the P-type transistor and another terminal coupled to the positive terminal of the amplifier;
- a fourth resistor, connected in series between the third resistor and second reference voltage; and
- a third switch, connected in series between the third resistor and the second reference voltage.

19. The system of claim 18, wherein when the voltage generation circuit operates in the first mode, the third switch is nonconducting; and when the voltage generation circuit operates in the second mode, the third switch is conducting.

20. The system of claim 15, wherein the chip further comprises a digital-to-analog converter or an analog-to-digital converter, and the first output voltage and the second output voltage are used as a reference voltage of the digital-to-analog converter or the analog-to-digital converter.

* * * * *